Oct. 16, 1962  A. F. McFARLAND ET AL  3,058,351
ELECTRICAL AUTOMATIC PIPE LINE SAMPLER
Filed March 4, 1959  3 Sheets-Sheet 1
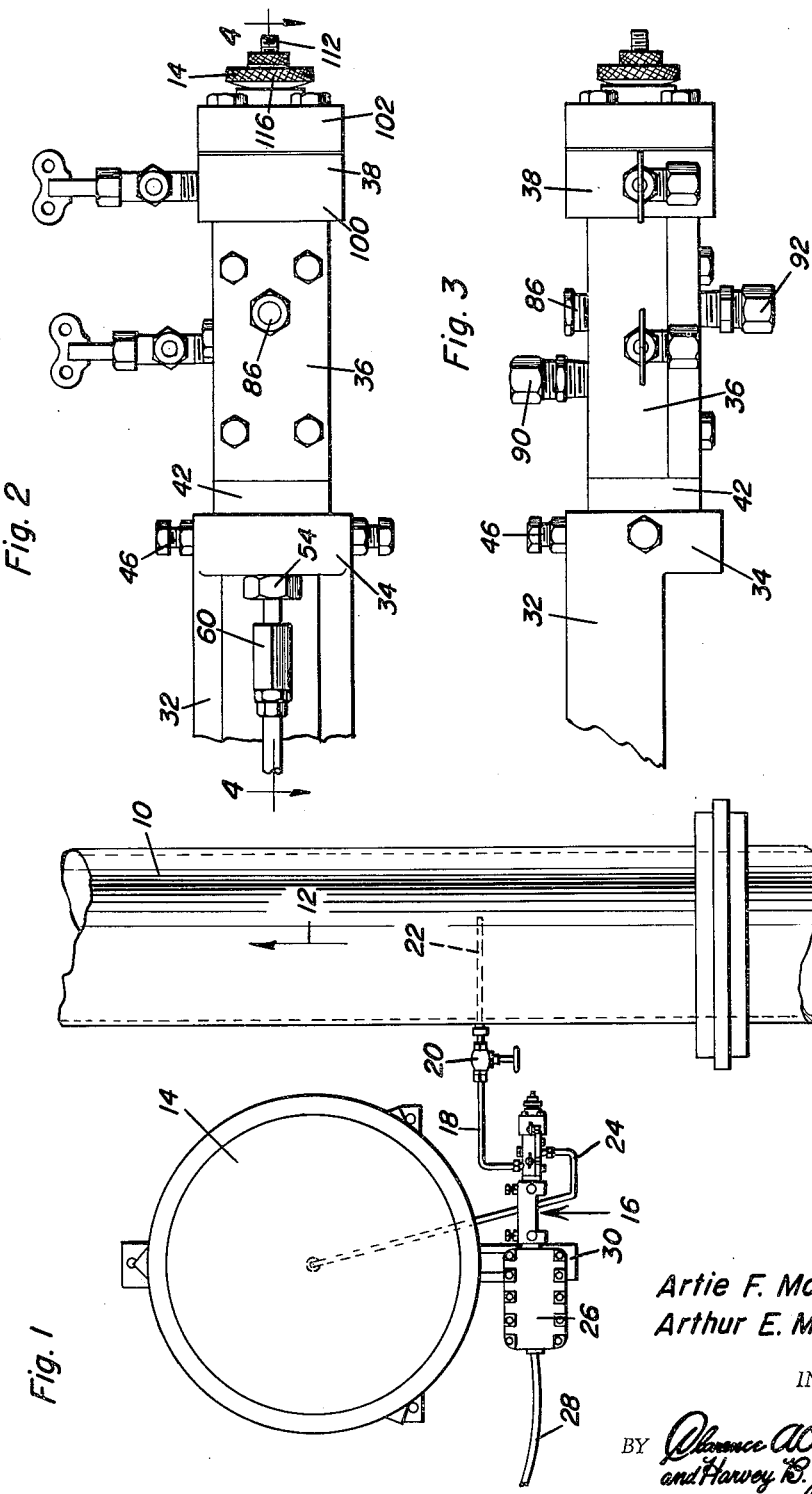
Artie F. McFarland
Arthur E. McFarland
INVENTORS

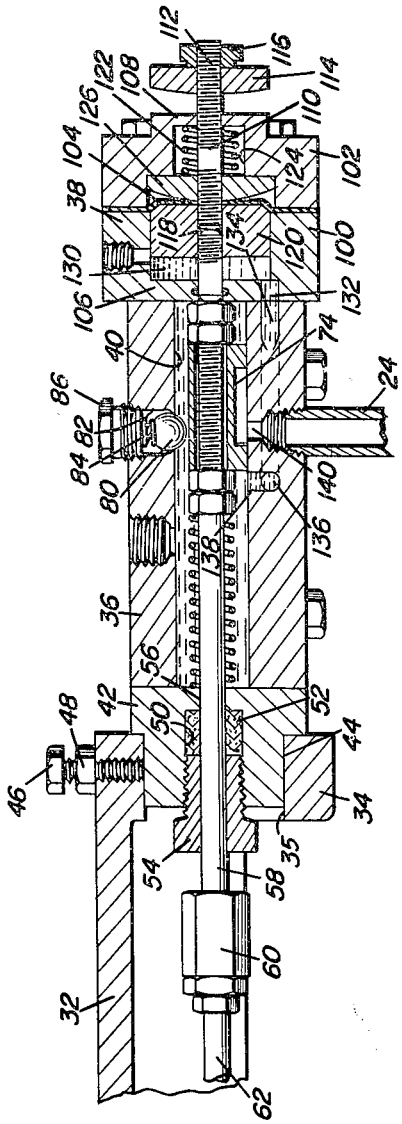

Oct. 16, 1962 A. F. McFARLAND ET AL 3,058,351
ELECTRICAL AUTOMATIC PIPE LINE SAMPLER
Filed March 4, 1959
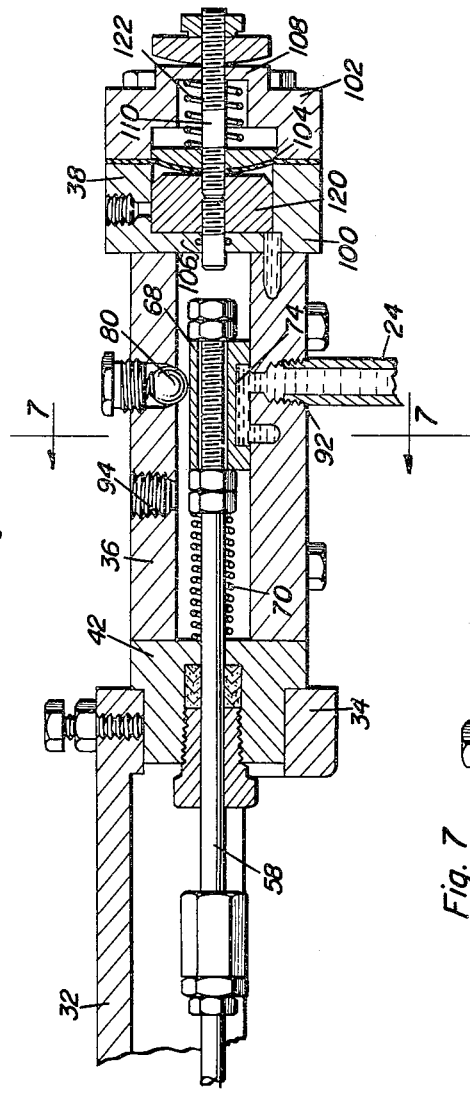
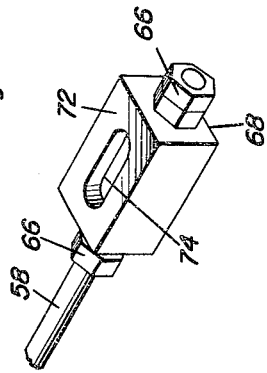
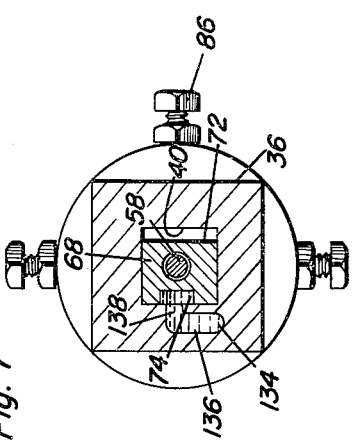
Artie F. McFarland
Arthur E. McFarland
INVENTORS

United States Patent Office 3,058,351
Patented Oct. 16, 1962

3,058,351
ELECTRICAL AUTOMATIC PIPE LINE SAMPLER
Artie F. McFarland, 7208 Brownwood, Houston 20, Tex., and Arthur E. McFarland, 5304 Carrolton, Houston 23, Tex.
Filed Mar. 4, 1959, Ser. No. 797,269
9 Claims. (Cl. 73—422)

This invention comprises a novel and useful electrical automatic pipe line sampler and more particularly relates to an apparatus for automatically extracting measured samples from a pipe line in timed relation to and in correlation with the operation of a flow meter for the pipe line, whereby the quantity of the samples collected will be adjustably proportioned to the volume of flow through the pipe line.

A further and primary object of the invention is to provide an automatic pipe line sampler wherein the sampling mechanism may be operatively connected to a flow meter especially of the electrical impulse type whereby the sampler will be intermittently operated in timed relation to and in proportion to operation of the flow meter.

A further object of the invention is to provide a sampling device in accordance with the preceding objects which will enable samples to be intermittently extracted from a flow line and wherein the quantity of the samples so extracted may be readily varied and adjusted with precision.

A further important object of the invention is to provide a sampling device for pipe lines which shall include a metering unit operatively interposed between the pipe line and a suitable collecting means for the samples and which metering units shall be operated in proportion to the volume of flow through the pipe line and shall be directly actuated by a flow meter registering the volume of flow through the pipe line.

Another important object of the present invention is to provide a pipe line sampling device in accordance with the immediately preceding object wherein the metering unit may consist of a variable capacity adjustable pump for extracting the discharging measured samples from the pipe line together with a control valve for intermittently placing the pump into communication with the pipe line and with the sample discharge line, and further whereby the control valve shall itself control the operation of the pump.

Yet another important object of the invention in accordance with the immediately preceding objects is to provide a metering unit wherein the metering pump constitutes a closure for the valve chamber of the control valve and whereby actuating rods of the pump and of the control valve are disposed in endwise, axially aligned position in order that operation of the control valve shall in turn constitute the operating means for the measuring pump.

A still further and more specific object of the invention is to provide in accordance with the immediately preceding objects an improved construction of control valve with means resiliently urging the control valve into operative sliding engagement with the ports which it controls; and whereby adjusting means are provided for independently regulating the adjustment of the control valve in its valve chamber and of the capacity of the pump.

And a final important object of the invention to be specifically numerated herein resides in the provision of a pipe line sampler in accordance with all of the foregoing objects which shall be extremely compact in size, very accurate and efficient in its operation, and shall be capable of actuation by a variety of types of actuating mechanisms.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary view showing in plan and somewhat diagrammatically the manner in which the electrically operated automatic sampler of this invention is operatively associated with a pipe line for removing measured samples therefrom and with a sample collectings means for discharging measured samples thereinto, certain concealed parts being shown in dotted lines therein;

FIGURE 2 is a fragmentary elevational view of the metering unit of the pipe line sampler in accordance with this invention;

FIGURE 3 is a top plan view of the metering unit as shown in FIGURE 2;

FIGURE 4 is a horizontal longitudinal central sectional view taken upon an enlarged scale substantially upon the plane indicated by the section line 4—4 of FIGURE 2 and showing the position of the control valve and of the measuring pump when the device is in the position for extracting a sample from the pipe line;

FIGURE 5 is a view similar to FIGURE 4 but showing the position of the parts when they are in the position for beginning the discharge of the measured sample from the pump into the delivery conduit for discharge into the sample collecting means;

FIGURE 6 is a view similar to FIGURES 4 and 5 but showing the position of the parts at the completion of the discharge of the measured sample by the pump into the discharge conduit and the sample collecting means;

FIGURE 7 is a vertical transverse sectional view taken substantially upon the plane indicated by the section line 7—7 of FIGURE 6 and showing more clearly the relative disposition of the port and passage structure of the control valve unit of the invention; and FIGURE 8 is a perspective view of the slide valve element of the control valve unit of the invention.

The intermittently periodic taking of measured samples of fluid passing through a pipe line is now a widely employed and extremely useful means for obtaining various necessary data with regard to the rate of flow of fluids through a pipe line, and the various components of the fluids which flow through the line. In order for such an apparatus to perform its intended function, it is essential that there shall be provided a means for adjusting the quantity of the sample educted from the pipe line with extreme precision. Further, it is frequently highly desirable if not essential to the purpose for which samples are removed to remove such samples with an intermittent frequency which is in a fixed proportion to the total volume of flow through the pipe line. The present invention provides a sampling apparatus especially effective for the foregoing fundamental purposes.

Shown in FIGURE 1 is a portion of a pipe line 10 through which is flowing a fluid in the direction indicated by the arrow 12, and which fluid is to be sampled. It is to be assumed that the flow of fluid through the pipe line may be subject to variations in the velocity of flow, and also variation as to the proportion of the different components in the fluid. Indicated by the numeral 14 is a sample collecting means in the form of a tank reservoir or the like and into which the measured samples intermittently educted from the pipe line are to be collected and accumulated for subsequent examination or testing.

In accordance with the present invention there is operatively connected to the pipe line 10 and to the sample collecting means 14 a metering unit which is designated generally by the numeral 16 and which controls both the quantity of the sample educted from the pipe line and also the frequency of the sampling operation. For this purpose the metering unit 16 is provided with a sampling conduit 18 having therein a conventionally manually operated cut-off valve 20 and being provided with an inlet portion 22 which extends into the pipe line and across the latter, being provided with the usual orifices for receiving and educting a portion of the fluid flowing through the pipe line. Also connected to the measuring unit 16 is a delivery conduit 24 which discharges the measured samples educted from the pipe line into the sample collecting means 14.

An actuating means 26 is in turn connected to the metering unit to control the time of the operation of the latter and to provide the necessary power for such operation as set forth hereinafter. The actuating means in turn is operatively connected by an electric circuit, a portion of which is indicated by the electrical cable 28 to some means which is responsive to and proportionate to flow through the pipe line, as for example to an electrical impulse flow meter of a conventional design, not shown.

As so far described it will thus be apparent that the solenoid 26 will be actuated in timed relation to the operation of the flow meter and thus will be operated at a frequency which is directly proportional to the volume of fluid passing through the pipe line 10. This assures that the metering unit 16 will in turn have a properly synchronized or correlated relation to the volume of flow through the pipe line so that the measured samples educted thereby will be directly proportioned in their total volume to the total flow through the pipe line.

At this point it is desired to note that although for the purpose of clearly illustrating a preferred embodiment of this invention the actuating means by which the metering unit is operated in timed and synchronized relation to flow through the pipe line consists of a solenoid it is obvious that various other means such as fluid pressure actuators and the like can be employed to supply the necessary power; and that although the flow meter constitutes the means for timing or synchronizing the frequency of operation of the metering unit to flow through the pipe line, other means and methods for obtaining the desired synchronized relation are possible and fall within the scope of this invention.

Attention is now directed more specifically to FIGURES 2–8 for an understanding of the construction and the operation of a preferred embodiment of a metering unit 16. While such a unit may be mounted and supported in any desired manner, it has been diagrammatically indicated in FIGURE 1 that a mounting bracket or support 30 secured to the side of the sample collecting means 14 may serve to support and mount the solenoid 26, while the casing of the latter in turn carries and supports the various elements which constitute the metering unit.

Attention being now directed specifically to FIGURES 2–6 it will be observed that there is provided a support member 32, adapted to be carried by the casing of the solenoid and thus supported by the bracket 30 as previously mentioned, and which at one end is provided with an annular enlargement, ring or flange 34 having an aperture 35 therethrough. This aperture and this flange serve to seat and support thereon a control valve 36 and a pump 38.

Referring now directly to FIGURES 4–6 it will be seen that the control valve 36 consists of an elongated hollow body which may be generally square or rectangular in cross-section as will be apparent from FIGURE 7 and which thus provides an axially extending valve chamber 40 of uniform diameter extending throughout its length. The valve chamber is open at both ends, one end being closed by a block or body 42 while the other end is closed by the pump unit 38 previously mentioned, it being understood that the block 42 and the pump 38 are rigidly but detachably secured to the control valve member 36 in any desired manner, not shown.

The body 42 has a diametrically reduced cylindrical portion 44 which is received in the aperture 35 previously mentioned in the flange 34, being retained therein as by a plurality of retaining bolts 46 provided with lock nuts 48. Thus, the control valve 36, and the pump 38 carried on the other end thereof, are detachably secured to the member 32.

The body 42 is provided with a central bore 50 therein in which is received a packing or sealing means 52 of conventional design retained as by a packing gland 54 which is screw threaded into the open extremity of the bore. Slidably received through the packing gland, the packing means 52 and a further bore 56 extending through the body 42 is the valve actuating rod 58 which is thus slidably and guidably mounted. The actuating rod is provided with an adjusting or coupling member 60 by which the same is secured to one end of a shaft 62 which may comprise the armature of the solenoid 26 or some other source of power by which reciprocatory movement is imparted to the actuating rod.

The other end of the actuating rod 58 extends throughout the major portion of the valve chamber 40 and upon its inward extremity is provided with external treads 64 together with lock nuts 66. Clamped in longitudinally adjusted position upon the actuating rod 58 between these lock nuts is a slide valve 68 of a construction shown best in FIGURES 7 and 8 and to be later described.

A compression spring 70 encircles the actuator rod 58 between the member 42 and the adjacent set of lock nuts 66 to yieldingly urge the slide valve inwardly of the valve chamber 40 and towards the pump unit 38.

As will be observed from a comparison of the showing of FIGURES 4–6 with that of FIGURE 7, and in conjunction with FIGURE 8, the slide valve is substantially square or rectangular in cross-section having a flat plane face 72 which is out of contact with either side wall of the valve chamber. The valve body includes an intermediately disposed recess or slot 74 which extends longitudinally along one side of the body and lies intermediate the opposite ends of the valve. The side of the body having the recess 74 slidably engages one wall of the valve chamber to control the ports formed therein as set forth hereinafter. The valve is retained yieldingly against this wall in order to establish an effective sealed engagement of recessed side with this wall by means of a ball 80 disposed in a chamber 82 opening through the casing or body of the control valve assembly and into the chamber 40, a spring 84 secured by a plug 86 serving to yieldingly bear against the face 72 of the slide valve and yieldingly urge the valve towards the other wall of the chamber. Thus, during reciprocation of the valve in this chamber it is evident that the valved side thereof will be pressed into a tight sealing engagement with this other wall of the valve chamber.

Referring now particularly to FIGURES 2 and 3 it will be observed that a pair of nipples 90 and 92 are threaded into bores 94 and 96 respectively of FIGURES 4–6 which extend through the walls of the control valve 36 into the chamber 40 and which respectively communicate with the sampling conduit 18 and the delivery conduit 24.

Referring next to FIGURES 4, 5 and 6 it will be seen that the pump unit 38 consists of two cup shaped casings, 100 directly connected to the open end of the control valve 36 and 102 which is connected to the casing 100 so as to form therewith a pumping chamber, a diaphragm 104 being interposed therebetween. Slidable through the opposite end walls 106 and 108 respectively of the sections 100 and 102 is a pump actuating rod 110 which upon its outer extremity is provided with external threads 112 for the reception of a knob 114 with a lock nut 116. Intermediate its ends the actuating rod 110 is provided with a further externally threaded portion 118 upon which is adjustably secured a piston member 120.

A compression spring 122 surrounds the rod 110 and is received within a chamber 124 formed in the section 102, the opposite end of this spring abutting against the end wall 108 previously mentioned and against a block 126 which is secured to the threaded portion 118 and bears against one side of the previously mentioned diaphragm 104.

The space between the end wall 106 and the piston 120 comprises the working chamber or the pumping chamber 130 of the pump 38. This chamber communicates by means of a section of passage 132 extending through the end wall 106 and which communicates in turn with a further passage 134 formed in one wall of the control valve 36. The inward extremity of the passage 134 communicates by means of a cross passage 136 and a port 138 with the interior of the chamber 40 previously mentioned. This passage arrangement and its communication with the chamber 40 is also indicated in FIGURE 7.

A further port 140 enters the chamber 40 and establishes communication with the delivery conduit 24 as previously mentioned. It will be observed that the ports 138 and 140 are in spaced relation to each other longitudinally of the chamber so that they will be successively placed into or out of communication with each other and with the interior of the chamber 40 during reciprocation of the slide valve 68.

The spacing of the ports 138 and 140 with respect to each other and with respect to the disposition of the recess 74 of the slide valve is such that when the slide valve is shifted to its right hand extreme position as shown in FIGURE 4, the port 140 and thus the delivery conduit 24 will be shut off from communication with the interior of the chamber 40, while the latter including the constantly communicating sampling conduit 18 will be placed in communication by means of the passages 136, 134 and 132 with the interior of the pumping chamber 130 whereby the latter will be enabled to take in a charge of fluid. However, when the slide valve is moved to its other extreme position, as shown in FIGURE 5 and in FIGURE 6, the delivery conduit 24 will through its port 140 be placed in communication by means of the valve recess 74 with the port 138 and through the above mentioned passages with the interior of the pump chamber 130 to thus receive the measured charge contained in the pump chamber.

Referring again to FIGURES 4–6 it will be seen that there is provided a port 142 which communicates with the pump chamber 130 when the pump piston 120 is in its extreme inward position. This port may be used for various purposes as for example to provide a means for bleeding or filling the chamber 130 and the like.

It will now be understood that the inward extremity of the pump actuating rod 110 extends through the end wall 106 and into the valve chamber 40 where it is disposed in axial alignment with the valve actuator rod 58. The arrangement is such that the two actuator rods may move towards and from each other, with the valve actuator rod 58 comprising a means which can be placed into abutting engagement with the end of the pump actuator rod 110 and upon further inward travel will in turn impart reciprocatory movement to the pump actuator rod and thus force the latter inwardly against the spring 122 upon the pump suction stroke. When the actuator rod 58 is again retracted, as shown in FIGURE 5, it thus will provide a clearance which will permit the compression spring 122 to in turn urge the pump piston 120 inwardly from the position shown in FIGURE 5 to effect its delivery stroke and thus discharge the charge in the pump chamber 130 through the various above mentioned passages and conduits. The completion of the pumping stroke is indicated in FIGURE 6.

It should be understood that by adjustment of the knob 114 and lock nut 116 upon the threaded extremity 112 of the pump actuator rod 110, the latter may be adjustably stopped upon its inward stroke. Thus, as shown in FIGURE 6, the inward stroke of the pump will stop when either the pump piston strikes the end wall 106 or the adjustment knob 114 strikes the end wall 108. Further, the adjustment of the pump piston 120 upon the threaded portion 118 of the actuating rod 110 will also adjustably position the inward extremity of the actuating rod 110 relative to the position of the piston 120 in the working chamber 130. By this means a precise control can be obtained for the operating stroke of the piston 120 and thus a precise adjustment of the volume of the working chamber 130 can be secured. In this manner the volume of the sample which is withdrawn at each stroke of the pump can be very accurately regulated.

It will now be readily understood that the metering unit 16 consists of a pumping unit whose stroke and volume may be readily adjusted together with a control valve whose position with respect to its port may likewise be readily adjusted and wherein the control valve constitutes the actuating means for the reciprocating pump. There is thus provided a simple but highly efficient combination of a pump for withdrawing and delivering measured samples together with a control valve which not only properly times the connection of the pump to the sample conduit and to the delivery conduit but also serves as the actuating means for the pump.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An automatic pipe line sampler comprising a sampling conduit adapted for connection to a pipe line for intermittently removing samples therefrom, a delivery conduit for discharging samples to a sample collecting means, a sample metering unit connected to said conduits, actuating means connected to said metering unit and operable intermittently and in response to quantity of flow through said pipe line, said metering unit including a pump and a control valve operatively connected to said pump for operating the latter and intermittently and in alternation placing the pump in communication with each of said conduits, said actuating means being connected to said control valve, said control valve and said pump having each an actuating rod disposed in axial alignment, said metering unit including a valve chamber, said control valve including a slide valve slidable axially in said chamber, passage means in said metering unit having ports controlled by said slide valve and communicating with said pump and said conduits, said ports being formed in one wall of said valve chamber, resilient means in said valve chamber engaging said slide valve and urging it against said one wall.

2. An automatic pipe line sampler comprising a sampling conduit adapted for connection to a pipe line for intermittently removing samples therefrom, a delivery conduit for discharging samples to a sample collecting means, a sample metering unit connected to said conduits, actuating means connected to said metering unit and operable intermittently and in response to quantity of flow through said pipe line, said metering unit including a pump and a control valve operatively connected to said pump for operating the latter and intermittently and in alternation placing the pump in communication with each of said conduits, said actuating means being connected to said control valve, said control valve and said pump having each an actuating rod disposed in axial alignment, said pump including a piston on its actuating rod, spring means connected to each actuating rod and yieldingly urging the control valve and piston each towards one end of its stroke.

3. The combination of claim 2 including adjusting means on each actuating rod for independently adjusting the position of the control valve and of said piston.

4. An automatic flowing liquid sampler in combination with a source of flowing liquid and a liquid sample collecting means, said sampler comprising,
   (a) a valve chamber having a valve movable therein,
   (b) a pump chamber having a pump element movable therein,
   (c) inlet means for establishing continuous, uninterrupted communication between said valve chamber and said source of flowing liquid,
   (d) delivery means for establishing communication between said collecting means and said valve chamber,
   (e) supply means including said valve having continuous and uninterrupted communication with said delivery means and establishing controlled communication between said pump chamber and selectively with said delivery means and with said inlet means,
   (f) actuating means responsive to volume of flow of liquid in said source and operatively connected to said valve and pump element.

5. The combination of claim 4 including means yieldingly urging said pump element upon its fluid delivery stroke, said actuating means including a member fixedly secured to said valve, said pump element having an actuating element releasably engageable and operable by said member upon movement of the latter.

6. The combination of claim 5 including adjusting means associated with said actuating means for varying the volume delivered by said pump element.

7. The combination of claim 4 including adjusting means associated with said actuating means for varying the volume delivered by said pump element.

8. An automatic pipe line sampler for intermittently removing measured uniform samples of adjustable quantity from a pipe line comprising, a pump including a stationary pump casing having therein a movable pumping element and defining therewith an expansible pump chamber, stationary means including a passage having continuously unobstructed communication with a pipe line for removing samples therefrom for induction into said pump chamber, delivery means for discharging samples from said pump to a sample collection means, a control valve assembly connected to said sample removing means and said sample delivery means for intermittently placing the former and latter alternately into communication with said pump chamber, actuating means connected to said control valve assembly for effecting intermittent operation of said control valve assembly by a mechanical connection without time lag therein and in direct response to operation of a flow meter connected to a pipe line and whereby the frequency of the operation of said actuating means is directly proportionate to volume of flow in a pipe line despite fluctuations in the rate or volume of flow.

9. An automatic pipe line sampler comprising a pump including a stationary expansible pump chamber, stationary means including a passage having continuously unobstructed communication with a pipe line for removing samples therefrom for induction into said pump chamber, delivery means for discharging samples from said pump to a sample collection means, a control valve assembly connected to said sample removing means and said sample delivery means for intermittently placing the former and latter alternatively into communication with said pump chamber, actuating means connected to said control valve assembly for effecting intermittent operation of said control valve assembly in direct response to operation of a flow meter connected to a pipe line and whereby the frequency of the operation of said actuating means is directly proportionate to volume of flow in a pipe line despite fluctuations in the rate of volume of flow, said control valve assembly including a stationary housing having a valve chamber therein, a valve body movably received and confined in said valve chamber, fluid transfer means connecting said valve chamber and said pump chamber, said transfer and delivery means respectively including transfer and delivery ports opening into said valve chamber along one side wall thereof, said valve body including a transfer opening adjacent said one side wall and operable upon movement of said valve body for establishing and closing communication between said transfer and delivery ports.

References Cited in the file of this patent
UNITED STATES PATENTS

| | | |
|---|---|---|
| 2,584,106 | Batchelder et al. | Feb. 5, 1952 |
| 2,693,114 | Tapp et al. | Nov. 2, 1954 |
| 2,749,755 | Pressler | June 12, 1956 |
| 2,794,344 | Boren | June 4, 1957 |
| 2,886,000 | Clegg | May 12, 1959 |
| 2,986,940 | Russell | June 6, 1961 |